United States Patent [19]

Reimels

[11] 3,713,533
[45] Jan. 30, 1973

[54] HEMOSTATIC CLIP HOLDER
[75] Inventor: Harry G. Reimels, Braintree, Mass.
[73] Assignee: Codman & Shurtleff, Inc.
[22] Filed: April 28, 1971
[21] Appl. No.: 138,055

Related U.S. Application Data

[63] Continuation-in-part of Ser. No. 38,986, May 20, 1970, abandoned.

[52] U.S. Cl. ............... 206/56 DF, 72/410, 128/325
[51] Int. Cl. ..................... A61b 17/12, B65d 83/00
[58] Field of Search ............ 29/212, 243.56; 72/410; 128/325, 334 R, 335; 206/56 R, 56 DF, 63.2 R; 221/198, 279; 227/19, 95, 120, 136

[56] References Cited

UNITED STATES PATENTS

| 1,746,495 | 2/1930 | Palmgren | 227/95 |
| 2,237,589 | 4/1941 | Dole | 206/56 DF UX |
| 3,270,745 | 9/1966 | Wood | 128/325 |
| 3,315,863 | 4/1967 | O'Dea | 206/56 DF X |

Primary Examiner—Joseph R. Leclair
Assistant Examiner—Steven E. Lipman
Attorney—James R. Hulen and Robert L. Minier

[57] ABSTRACT

A clip holder for securely retaining a plurality of partially formed hemostatic clips prior to withdrawal of the clips by a clip applicator is constructed to provide a plastic housing having a generally rectangular opening therethrough and opposed inwardly directed shoulders at one end of the opening for supporting only the ends of the clips. A clip forming element having an outer surface configuration conforming to the contour of a completely formed clip is positioned within the housing in contact with the center of the clips, so that, the clips, upon withdrawal from the holder, must be completely formed against the forming element by the clip applicator.

20 Claims, 20 Drawing Figures

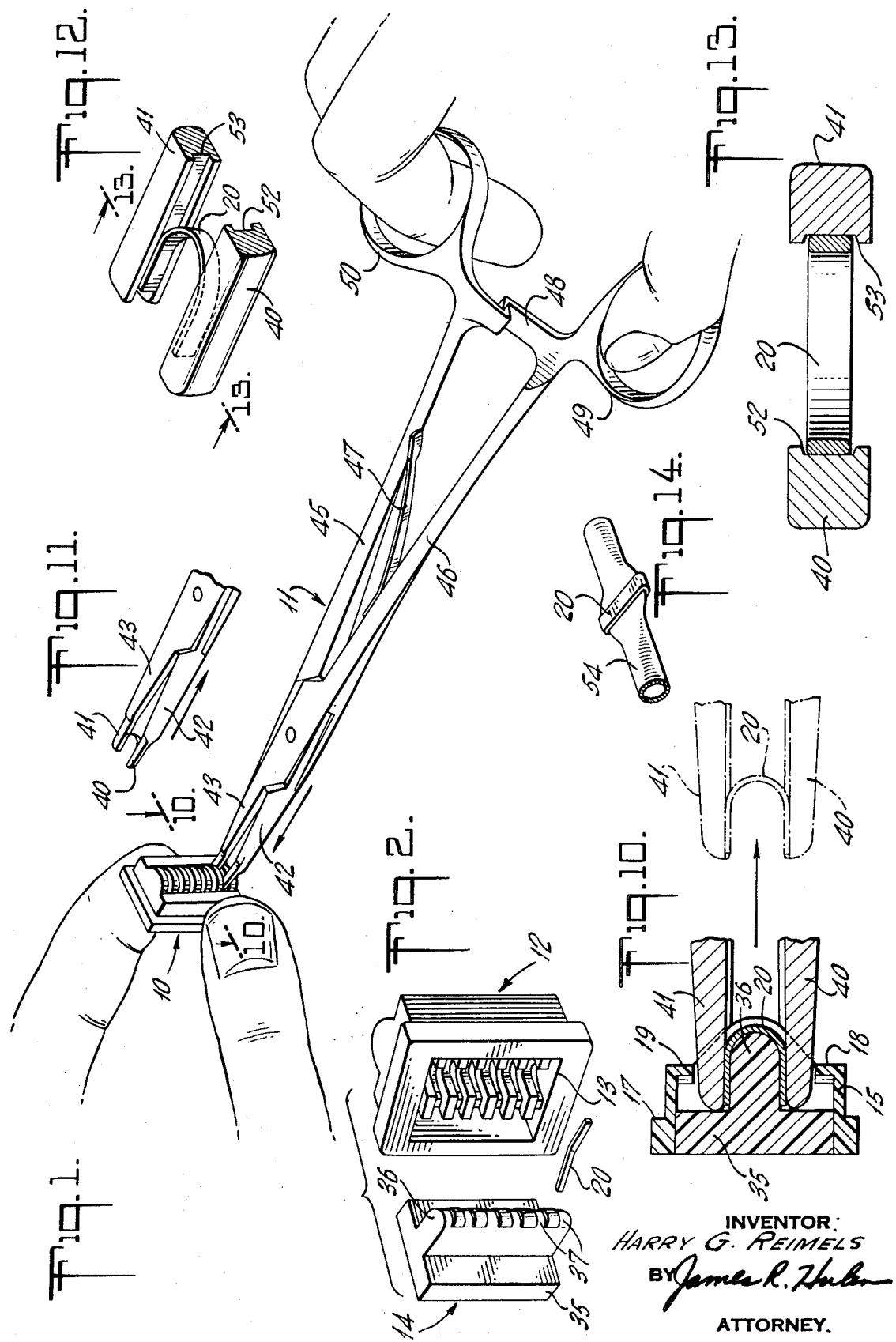

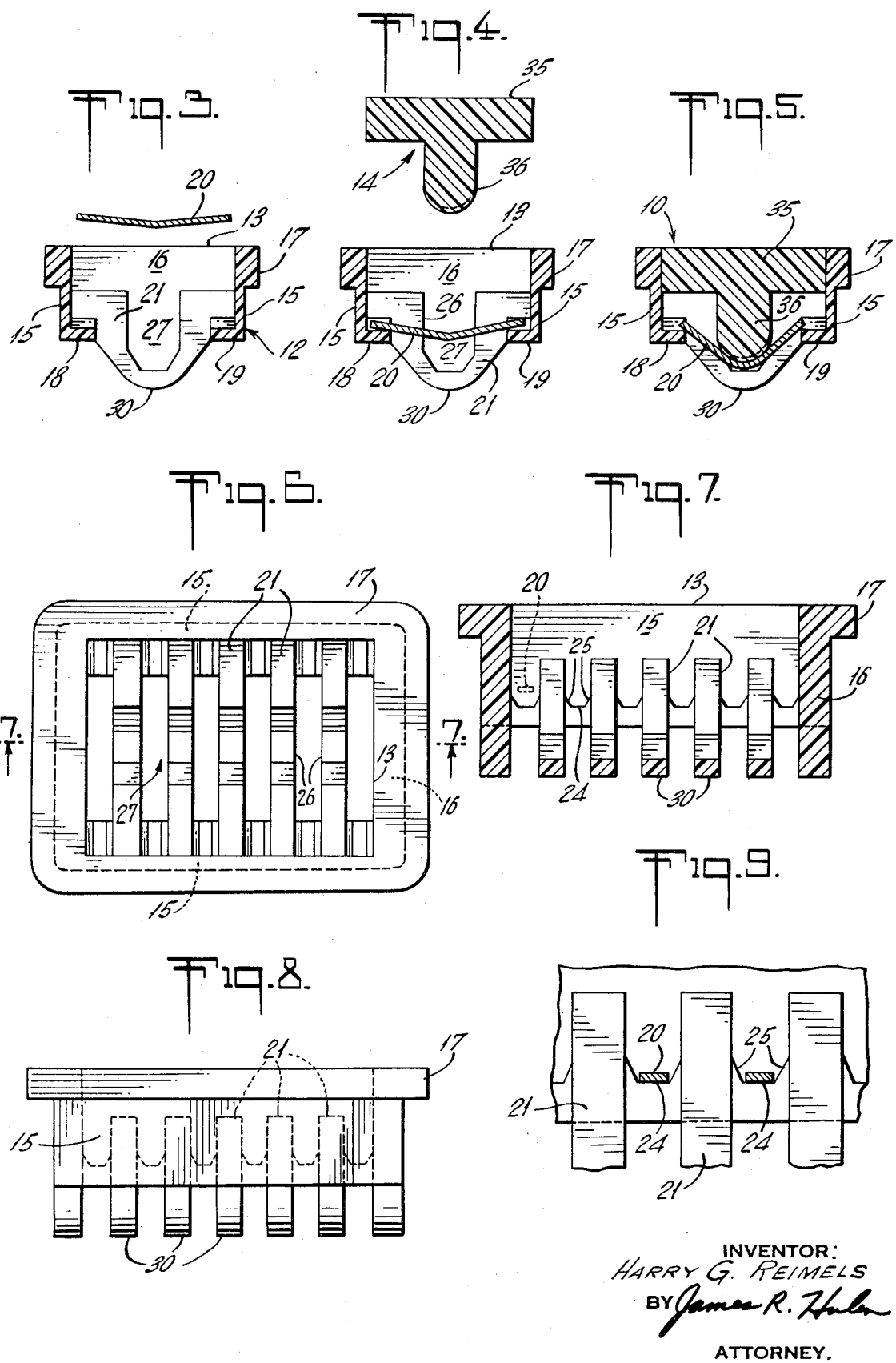

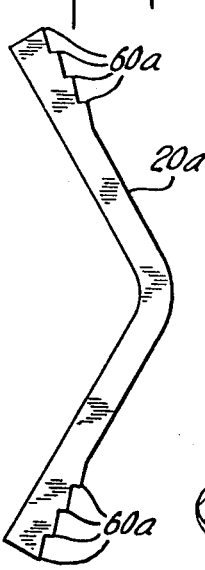
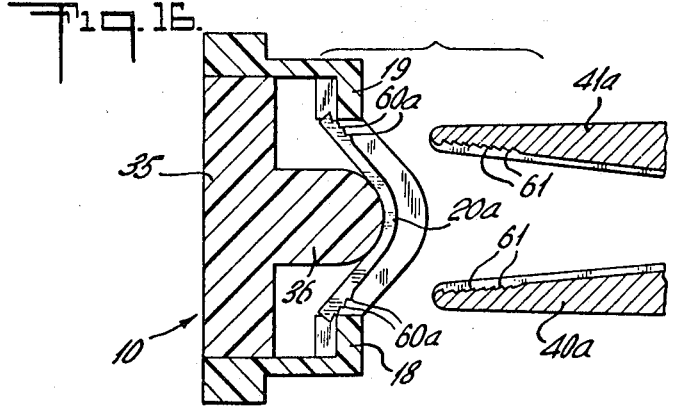
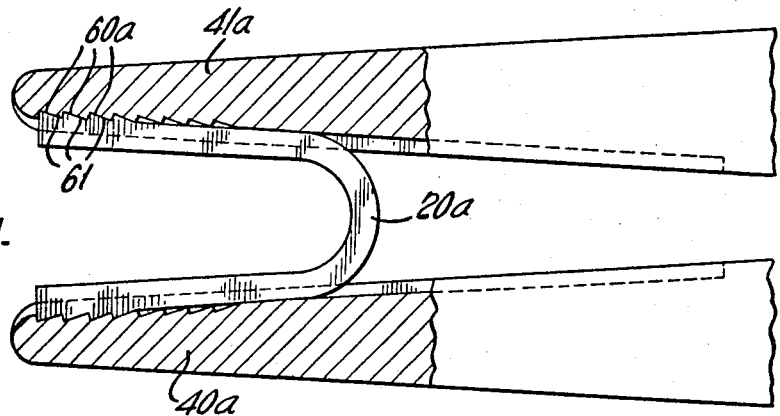
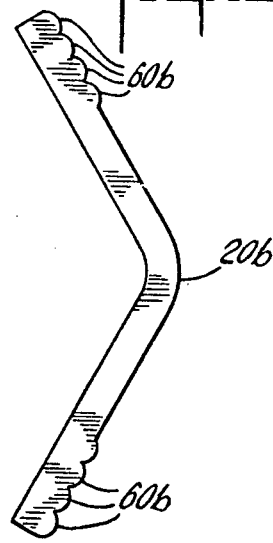
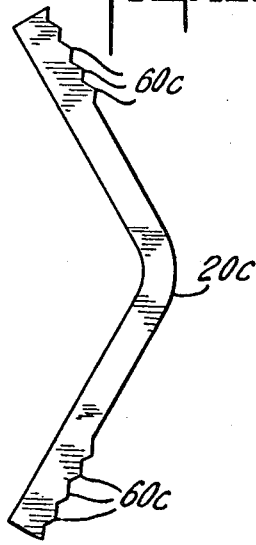
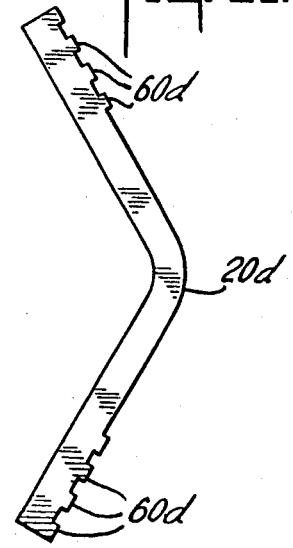

HEMOSTATIC CLIP HOLDER

BACKGROUND OF THE INVENTION

This is a continuation-in-part of application Ser. No. 38,986, filed May 20, 1970 now abandoned. This invention relates to hemostatic clips and, more particularly, the invention relates to a clip holder for securely retaining a plurality of hemostatic clips prior to withdrawal of the clips by a clip applicator.

The use of clips for clamping blood vessels during a surgical operation is a well known practice and specific clip and clip holder constructions have been the subject matter of many previous patents. For example, U.S. Pat. No. 3,326,216 illustrates a specific hemostatic clip construction and the preferred method for positioning the clip relative to a blood vessel. The patent also shows a magazine or holder for supporting a number of clips in a suitable position for withdrawal by a clip applicator. Since the clips are extremely small, it is necessary to provide such a holder to facilitate handling and alignment of the clips with the clip applicator.

Although the clip holder described in the above-cited patent provides an improved device for storing and handling hemostatic clips, it has been found that clips stored in this manner have a tendency to become loosened during shipping and handling and may be completely dislodged from the clip holder. This is true because the device relies entirely upon the frictional contact between the clips and the holder to retain the clips therein. Also, even a slightly loosened clip may move out of alignment and create difficulties for the surgeon in his attempt to withdraw the clip with a clip applicator.

United States Pat. No. 3,270,745 describes a clip holder which positively retains the preformed clips, however, it is not clearly stated in this patent how the clips may be effectively removed from the holder. It would appear that the inner action of the jaws of the forceps would counteract the outward deformation of the clip, which deformation is necessary to effect removal of the clip from the holder. In addition, the inherent spring action of the clip would tend to eject the clip from the inner faces of the applicator jaws after removal of the clip from the magazine.

Heretofore, there were no known hemostatic clip holders that combined the desirable qualities of total retention of the clips during shipping and handling with the relative ease of the withdrawal of the clips by a clip applicator.

SUMMARY OF THE INVENTION

The present invention furnishes the desirable qualities stated above by providing a clip holder that positively locks the ends of the clip within an opening formed in the holder. A clip forming element bears against the inner, central portion of the clip to form an anvil against which the clip must be formed by the clip applicator prior to withdrawal of the clip from the holder.

With this type of construction, it is absolutely impossible for the clips to become dislodged from the holder and the clips are always held in a predetermined position for alignment with the clip applicator. The manipulative procedure required for complete formation and release of the clip is an inward thrust of the clip applicator which accomplishes the desired bending of the partially formed clip around the clip-forming anvil. It is then only necessary to pull the applicator from the holder and the completely formed clip will be retained within the jaws of the applicator by the outward spring action of the clip in a position for application to a blood vessel or other body member. The invention further contemplates the use of positive gripping means on the ends of the hemostatic clips which coact with complementary means on the inner surfaces of the applicator jaws to positively retract the clips from the holders.

DESCRIPTION OF THE DRAWINGS

The invention will be particularly described with reference to the following detailed description of the preferred embodiment of the invention when considered together with the attached drawings, in which:

FIG. 1 is a perspective view illustrating the clip holder of the present invention together with a clip applicator in position for withdrawal of a clip from the holder;

FIG. 2 is a perspective view showing the main elements of the clip holder and a clip in position for placement into the holder;

FIG. 3 is a cross sectional view of the housing portion shown in FIG. 2 with a clip positioned for placement into the housing;

FIG. 4 is a cross sectional view of a housing similar to FIG. 3 illustrating a clip supported within the housing and the clip forming element in position for placement within the housing;

FIG. 5 is a cross sectional view of the housing and clip forming element positioned relative to one another with a clip held firmly therebetween;

FIG. 6 is a top plan view of the housing portion of the clip holder shown in FIG. 2;

FIG. 7 is a cross sectional view of the housing portion shown in FIG. 6 taken along line 7—7;

FIG. 8 is a side view of the housing portion of the holder shown in FIG. 6;

FIG. 9 is a fragmentary cross sectional view showing the position of the clips within the housing portion of the holder;

FIG. 10 is a fragmentary cross sectional view taken along line 10—10 in FIG. 1 and illustrating in phantom the position of a completely formed clip relative to the clip applicator after withdrawal thereof from the clip holder;

FIG. 11 is a fragmentary perspective view of the completely formed clip and clip applicator in the withdrawn position;

FIG. 12 is an enlarged cross sectional view of the end portion of the clip applicator showing a completely formed clip positioned between the jaws thereof;

FIG. 13 is a cross sectional view taken along line 13—13 in FIG. 12;

FIG. 14 illustrates the position of a clip after it has been applied to a blood vessel;

FIG. 15 is a side view of another embodiment of the hemostatic clip showing positive gripping means on the ends thereof;

FIG. 16 is a cross sectional view showing the clip of FIG. 15 supported within the holder of the present invention and a clip applicator having complementary gripping surfaces on the ends of its jaws;

FIG. 17 is a cross sectional view of the end portion of the clip applicator having a completely formed clip positioned between the jaws thereof; and FIGS. 18, 19 and 20 illustrate further embodiments of the hemostatic clip of FIG. 15.

Referring to FIG. 1, the clip holder of the present invention is shown generally at 10 and is illustrated as being held between the forefinger and thumb of a surgeon or nurse. A clip applicator 11 is held in the other hand of the surgeon in a position best suited to completely form and withdraw a clip from the clip holder. The internal construction of the clip holder 10 may best be seen in FIG. 2 wherein the individual components of the holder are shown in position for the loading of a clip into the holder. The main component of clip holder 10 is a housing 12 which is preferably constructed of a rigid plastic material. Housing 12 has a generally rectangular opening 13 passing therethrough for receiving the plurality of clips that are to be retained therein by a clip forming element 14.

Housing 12 is shown in a cross sectional view in FIG. 3 as having a generally box-like configuration with two opposed side walls 15 and two opposed end walls 16. The upper portion of housing 12 has an outwardly extending flange 17 which facilitates handling of the holder and provides a more sturdy construction. The lower portion of housing 12 is constructed with opposed inwardly extending shoulders 18 and 19 which are adapted to support a clip 20 (see FIG. 2) which is dimensioned to fit within the housing and be supported across the lower portion of opening 13 by the shoulders.

The detailed construction of housing 12 is shown more specifically in FIGS. 6-8 wherein the basic box-like structure formed by walls 15 and 16 has a central opening 13 passing therethrough and is reinforced at its upper rim by outwardly extending flange 17. A plurality of spacer elements 21 are secured between walls 15 and divide opening 13 into a plurality of spaces, each of which has a portion of shoulders 18 and 19 extending thereinto. Actually, shoulder 18, as well as shoulder 19, may be considered to be a single inwardly extending shoulder or as a plurality of individual inwardly extending shoulders separated by spacer elements 21. Spacer elements 21 not only partition housing 12 into a plurality of clip receiving spaces, but also facilitate the assembling of the entire clip holder by providing individual pockets 24 into which the clips may be placed. To further facilitate the positioning of the clips, pockets 24 are tapered upwardly as at the inclined portion 25 and form a bottom width essentially equal to the width of clip 20 (see FIG. 9).

A slot 26 is formed in each spacer element 21 and the slots are all aligned to form a channel 27 for receiving clip forming element 14. The arcuately shaped portions 30 of spacer elements 21 extend outwardly from opening 13 and provide a guiding means for the tips of the clip applicator 11 to assure that the applicator will be properly aligned with the clip 20.

The assembly of clips 20 within the clip holder 10 is best illustrated in FIGS. 3 to 5 which show the sequential steps of positioning clips 20 within opening 13 and supporting the ends of the clips across the opening by shoulders 18 and 19. After each clip 20 has been properly positioned within a pocket 24, the clip forming element 14 is brought into position within channel 27 and thereafter into contact with the clips 20 which are suspended across opening 13 by shoulders 18 and 19. Referring to FIG. 4, clip forming element 14 is constructed in a generally T-shaped configuration with an upper portion 35 which conforms in cross sectional configuration to the upper portion of opening 13 and is designed to have a press-fit within the opening with walls 15 and 16. Depending from block 35 is a projection 36 that is designed to fit closely within channel 27. Projection 36 forms the clip forming element or anvil around which the clips must ultimately be formed prior to withdrawal of the clips by the clip applicator 11.

Referring to FIG. 2, the outermost end of projection 36 is illustrated more clearly and the end is shown with a plurality of indentation 37 which are designed to be in alignment with the pockets 24 and clips 20 located therein. This construction further facilitates the alignment of the essential parts of the clip holder and assures that the clips 20 will be maintained in a predetermined position for withdrawal by the clip applicator.

Referring again to FIG. 5, the clip holder 10 is shown in its completely assembled condition with one of the clips 20 suspended at its ends on shoulders 18 and 19 across opening 13 and with clip forming projection 36 contacting its approximate center on the side of the clip opposite the side that is contacted by the shoulders. The insertion of clip forming element 14 into opening 13 forces the projection or anvil 36 against the center of the clip and causes the clip to be deformed into a V-shape and to be held firmly in said shape and to be retained securely within clip holder 10. It will be understood that clips must be inserted within each of the pockets 24 and suspended across shoulders 18 and 19 prior to the positioning of clip forming element 14 within opening 13. The downward movement (as viewed in FIG. 5) of the anvil or projection 36 will thereby contact each of the clips and deform each clip uniformly to accomplish the desired result.

It will be apparent from the foregoing description that it is impossible for clips 20 to be removed, either intentionally or accidentally, from clip holder 10 without further deformation of the clips. Therefore, the clips cannot be accidentally loosened or dislodged from the clip holder during shipping or handling of the product.

When it is desired to utilize the clips during a surgical procedure, the surgeon must only insert the tips of clip applicator 11 between the individual clip applicator guiding means 30 and into contact with a particular clip 20. Clip applicator 11 (see FIG. 11) is constructed so that the tips 40 and 41 of jaws 42 and 43, respectively, are reduced in thickness so that they have a width approximately the same as the clearance formed between adjacent guide means 30. The preferred clip applicator is illustrated with this invention in the form of forceps having a pair of pivotally connected arms 45 and 46 which terminate in jaws 42 and 43, respectively. The operating end of arms 45 and 46 have conventional ring-type gripping members and the jaws are held in a predetermined spaced position by a leaf spring 47 and a stop means 48 located between the ring members 49 and 50. This arrangement insures that the tips 40 and 41 will be in a properly spaced position for insertion into the clip holder 10.

When it is desired to remove a clip from the clip holder, it is only necessary for the surgeon to grasp the clip holder and the clip applicator and to thrust the tips of the applicator into one of the spaces provided between guide means 30 and into contact with the suspended arms of a clip 20. This procedure accomplishes the further deformation of clip 20 thus placing it in a completely formed condition and also releases the suspended ends of the clip from shoulders 18 and 19 thereby rendering it possible for the clip applicator to withdraw the clip from the holder as illustrated in the phantom view of FIG. 10. As will be seen more clearly in FIGS. 12 and 13, tips 40 and 41 are constructed with channels 52 and 53, respectively, in the ends thereof to provide a gripping surface for retaining the withdrawn clip 20 therebetween. Because the suspended arms of the clip must be deformed inwardly in order to effect removal of the clip from the clip holder, the arms will have a natural tendency to spring outwardly into contact with the inner gripping surfaces of tips 40 and 41 and thus be held firmly between the tips. The construction of tips 40 and 41 is not critical, however, as shown in FIG. 13, it is desirable to have the channels 52 and 53 shallower than the thickness of clip 20 so that tips 40 and 41 will not exert a cutting action on the blood vessel when clip 20 is applied thereto.

The remaining clips may be left in clip holder 10 or withdrawn therefrom as needed during the surgical operation. One such clip 20 is shown in clamping position around a blood vessel 54 in FIG. 14.

In some instances, it has been found to be desirable to provide positive gripping means on the outer ends of the hemostatic clips and complementary gripping means on the inner ends of the applicator jaws. This construction is best illustrated in FIGS. 15–17. Referring to FIG. 15, a clip 20a, shown in the configuration it takes when supported in holder 10, has a plurality of projections 60a in the form of saw teeth extending outwardly from the ends thereof. When clip 20a is supported in holder 10 between shoulders 18 and 19, as shown in FIG. 16, projections 60a extend outwardly in a position to be contacted by complementary projections 61 on the inner ends of the applicator jaws 40a and 41a. A meshing of the projections 60a and 61 occurs when the applicator jaws are forced into the holder and clip 20a is held firmly between the jaws, as illustrated in FIG. 17, when the applicator is withdrawn from the holder. Thus, in addition to the outward spring action of clip 20a, a positive gripping means is provided to prevent accidental ejection of the clip from the applicator.

FIGS. 18, 19 and 20 illustrate additional embodiments of the hemostatic clip construction shown in FIG. 15. The clips 20b, 20c, and 20d are equipped on the outer ends thereof, respectively, with projections 60b, 60c and 60d which are designed to cooperate with complementary projections (not shown) on the inner ends of suitable clip applicators. All of the projections are, of course, designed to assist the spring action of the clip to retain the clip more securely in the applicator jaws.

The material from which the clip of this invention is constructed is not critical, however, it is preferably formed of surgical metals which are nontoxic and which therefore can be tolerated within the body for indefinite periods of time. The preferred clip material for this invention is tantalum, however, stainless steel is an equally effective material. The material from which the clip holder 10 is constructed is also not critical, however, it is preferred to utilize a fairly rigid sterilizable plastic material that may be injection molded in a suitable manner. Examples of such plastic materials are acetal and polycarbonate.

It will be apparent from the foregoing description, that a unique hemostatic clip holder construction has been provided that yields several advantages over any previously known device. The unique manner in which the clips are stored within the holder positively eliminates the possibility that the clips will become misaligned or dislodged from the holder. On the other hand, it is a relatively simple matter to remove the clips from the holder when it is desired to utilize the clips in a surgical procedure.

What is claimed is:

1. A clip holder securely retaining a hemostatic clip prior to withdrawal of said clip by a clip applicator comprising:
   1. a housing having a pair of spaced clip supporting members defining an opening therebetween;
   2. a partially formed clip supported across said opening only at its two ends by said members; and
   3. a clip forming element mounted in said housing and having a projection with an outer configuration conforming to the desired contour of a completely formed clip, said projection being in contact with the approximate center of said partially formed clip on the side of said clip opposite said supporting members.

2. The clip holder of claim 1 wherein said clip forming element effectively forces the ends of said clip into contact with said support members.

3. The clip holder of claim 2 wherein said clip forming element extends partially through said opening and said clip is formed and held thereby into a V-shape.

4. The clip holder of claim 1 wherein said housing has a plurality of pairs of clip supporting members defining an opening therebetween, each pair of members supporting an individual clip across said opening.

5. The clip holder of claim 4 wherein each pair of clip supporting members is equipped with a clip centering means properly positioning said clip within said housing.

6. The clip holder of claim 5 further comprising spacer elements mounted in said housing between adjacent pairs of clip supporting members, each of said spacer elements having a slot therein receiving said clip forming element.

7. The clip holder of claim 6 wherein said slots are aligned to form a channel overlying said clips.

8. The clip holder of claim 1 wherein said clip has at least one projection extending outwardly from each of its two ends in the direction of said supporting members for meshing with complementary projections on the jaws of said clip applicator.

9. The clip holder of claim 8 wherein each end of said clip has a plurality of projections.

10. The clip holder of claim 9 wherein said clip projections are in the form of saw teeth.

11. A clip holder securely retaining a plurality of hemostatic clips prior to withdrawal of said clips by a clip applicator comprising:

1. a housing having a generally rectangular opening therethrough;
2. inwardly directed shoulders on opposite sides of one end of said opening;
3. a plurality of partially formed clips within said housing simultaneously supported at their ends across said opening by said shoulders, and
4. means within said housing forcing the ends of each of said clips against said shoulders.

12. The clip holder of claim 11 wherein said means contacts the side of each clip opposite its supported ends.

13. The clip holder of claim 12 wherein said means contacts only the approximate center of said clips.

14. The clip holder of claim 13 wherein said means is a clip forming element which has an outer surface configuration conforming to the desired contour of a completely formed clip.

15. The clip holder of claim 14 wherein the portion of said clip forming element in contact with said clips extends outwardly from said housing between said shoulders and forms said clips into a a V-shape.

16. The clip holder of claim 15 further comprising clip centering means located on said shoulders properly positioning said clips.

17. The clip holder of claim 16 further comprising spacer elements mounted in said housing between said clip centering means, each of said spacer elements having a slot receiving said clip forming elements.

18. The clip holder of claim 17 further comprising a clip applicator guide secured to each of said spacer elements and extending outwardly from said housing between said shoulders.

19. The clip holder of claim 16 wherein said clip forming element has a plurality of grooves in alignment with said clip centering means further positioning said clips.

20. The clip holder of claim 19 wherein said clip forming element is in the form of a projection which is integral with a substantially rectangular block that is securely fitted within the other end of said rectangular opening.

* * * * *